Feb. 15, 1944.   L. L. GREEN   2,341,985
PUMP
Filed May 22, 1941   2 Sheets-Sheet 1
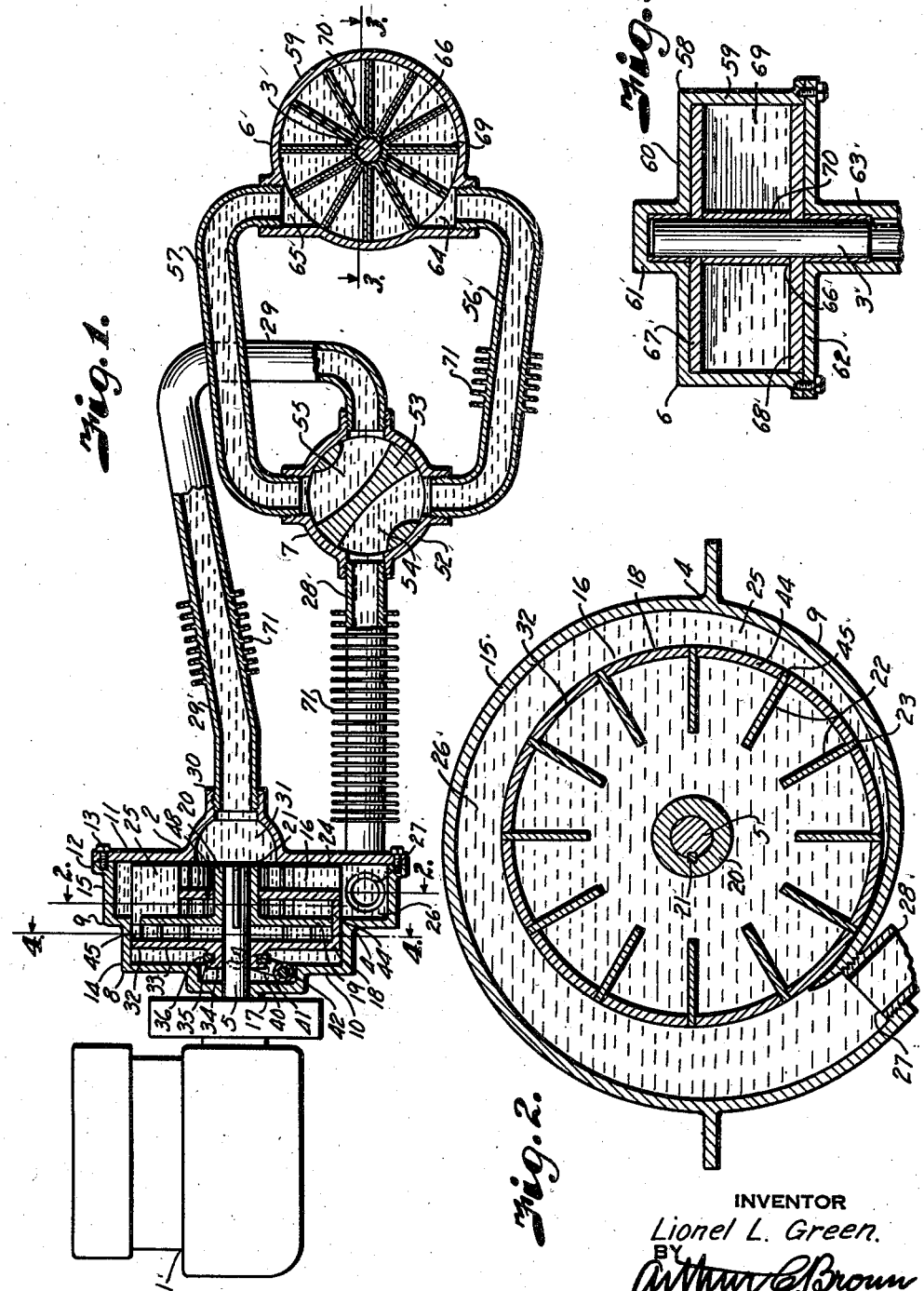
INVENTOR
Lionel L. Green.
BY
Arthur C. Brown
ATTORNEY

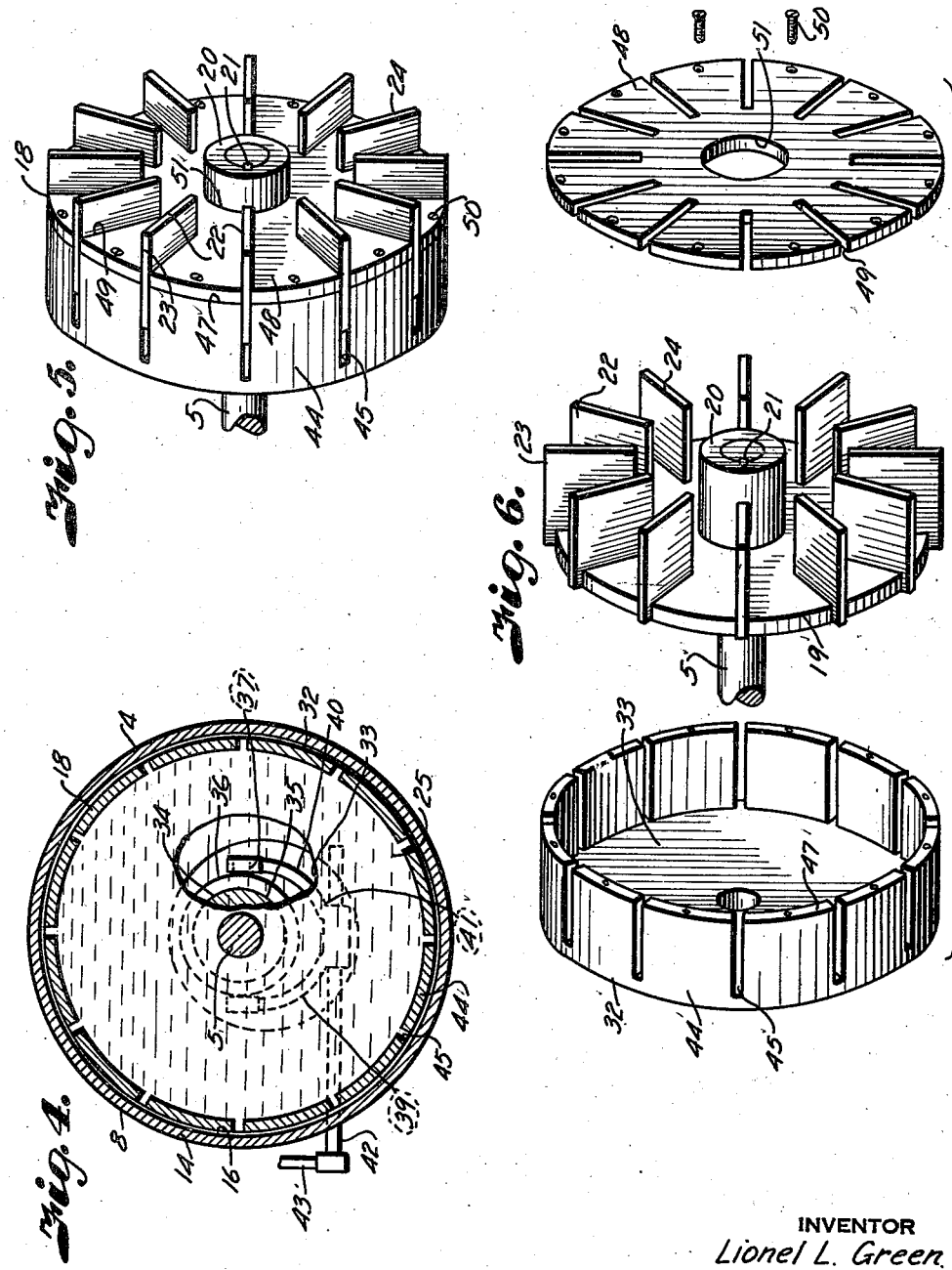

Patented Feb. 15, 1944

2,341,985

UNITED STATES PATENT OFFICE 2,341,985

PUMP

Lionel L. Green, Kansas City, Mo.

Application May 22, 1941, Serial No. 394,608

2 Claims. (Cl. 103—97)

This invention relates to a centrifugal pump for fluid pressure mechanism for transmitting power of a prime mover to a driven member, and has for its principal object to provide a mechanism of this character which circulates the fluid pressure medium only in quantity necessary to provide desired speeds of the driven member.

Another object of the invention is to provide a fluid pressure transmitting mechanism capable of actuating the driven members at an infinite number of speeds from high to low, which result by varying circulation of the pressure medium while maintaining a predetermined speed of the prime mover.

Further objects of the invention are to provide a fluid pressure transmitting mechanism particularly adapted for automative use; to provide a fluid pressure transmitting mechanism which includes an overdrive; to provide a pump element that is of simple, inexpensive construction and arranged to effect displacement of only the fluid necessary to maintain the desired speed of the driven member; and to provide a fluid pressure transmitting mechanism arranged to circulate the pressure fluid with a minimum loss of power due to friction of the fluid.

In accomplishing these and other objects of the invention, as hereinafter pointed out, I have provided improved details of structure, the preferred form of which is illustrated in the accompanying drawings, wherein:

Fig. 1 is a diagrammatic sectional view of a fluid pressure transmitting mechanism embodying the features of the present invention.

Fig. 2 is a cross-section through the pump element on the line 2—2 of Fig. 1.

Fig. 3 is a cross-section through the motor element for actuating the driven member, taken on the line 3—3 of Fig. 1.

Fig. 4 is a cross-section through the pump element on the line 4—4 of Fig. 1.

Fig. 5 is a detail perspective view of the assembly including the rotor and cage for controlling the effective area of the rotor blades.

Fig. 6 is a detail perspective view of the parts of the rotor shown in disassembled spaced relation.

Referring more in detail to the drawings:

1 designates a prime mover such as an internal combustion engine of a motor vehicle and which is operatively connected through a fluid pressure transmitting mechanism 2 with a driven shaft, indicated at 3, which may be the drive shaft of a motor vehicle. The fluid pressure transmitting mechanism embodies the features of the present invention and includes a pump assembly 4 actuated by the power shaft 5 of the prime mover 1 for circulating liquid under pressure to a motor unit 6, having connection with the drive shaft 3, the fluid being passed through a reversing valve 7.

The pump assembly 4 includes a casing 8 having an annular wall 9 closed at one side by an end plate 10 and at the opposite side by a cover plate 11 secured to a laterally extending flange 12 on the annular wall 9 by fastening devices, such as cap-screws 13. The wall 9 includes a cylindrical portion 14 and an offset portion 15 that is eccentric of the cylindrical portion and forms a rotor chamber 16. The end plate 10 has a hub portion 17 through which the power shaft 5 extends for mounting a rotor 18. The rotor 18 includes a disk-like body 19, having a hub 20 secured to the shaft 5 by means of a spline 21, the disk being located substantially in the plane of the offset in the outer wall 9 and of slightly smaller diameter than the inner diameter of the cylindrical portion 14. Extending laterally from the disk-like body of the rotor, and spaced from the hub thereof, is a plurality of vanes or paddles 22 having outer edges 23 projecting beyond the periphery of the disk-like body and contacting the inner face of the cylindrical wall portion 14. The blades extend across the rotor chamber and the radial edges 24 are in sealing contact with the inner face of the plate 11, as shown in Fig. 1, so that the enlarged offset portion forms the space in which the blades are planetated to effect centrifugal displacement of the liquid 25 into an annular passageway 26 which gradually increases in capacity in the direction of rotation of the rotor to discharge through an outlet 27 to which is connected a duct 28. Liquid is admitted to the rotor chamber substantially concentric with the shaft 5 through a duct 29, having connection with a collar 30 formed as a part of the plate 11 and which provides an intake chamber 31.

In order to control the effective displacement incidental to actuation of the rotor, the rotor is provided with a cage 32 having a disk-like end 33 provided with a hub 34 slidably mounted on the shaft 5 and which has an annular groove 35 mounting a collar 36 having trunnions 37 extending diametrically therefrom. The trunnions 38 are engaged with the yoke-shaped ends 39 and 40 of a shipper lever 41 which is mounted on a shaft 42 journalled on the casing and adapted to be actuated by a lever 43 fixed to a projecting end thereof so that the cage may be reciprocated to and from telescoping relation with the rotor blades as later described.

Extending laterally from the periphery of the disk portion of the cage is a cylindrical wall 44, having sliding contact with the inner face of the cylindrical wall portion 14 of the casing and which is provided with slots 45 to accommodate the outer portions 23 of the rotor blades 22. The annular wall 44 is of such width that when the disk portion of the cage is in close relation to the disk-like body 19 of the rotor, the annular edge 47 thereof will be spaced from the radial edges of the blades a distance to accommodate a cover plate 48 having lateral slots 49 registering with the slots 45 and through which the blades may be projected. The plate 48 is attached to the other elements of the cage by fastening devices, such as screws 50, extending through suitable openings in the plate and into threaded sockets in the wall 44. The center of the plate is provided with an opening 51 for passing the hub 20 of the rotor which serves as a guide in cooperation with the hub 34 in maintaining coaxial relationship of the rotor and cage.

With the construction thus far described, it is obvious that when the cage is moved to the right as shown in Fig. 1, until the radial edges of the blades register with the exterior side of the plate, no part of the blades is effective in displacing the fluid since the liquid contained within the cage is rotated with the rotor and there is no outlet therefor, the slots in the cage being occupied by the blades. However, if the cage is moved to the left, Fig. 1, the radial edges of the blades are gradually exposed so that they are effective in displacing the liquid into the passageway 26 under sufficient pressure to effect movement through the duct 28 while the displaced liquid is being replaced with liquid supplied through the duct 29. As the cage is moved further in the direction of the motor, a greater area of the blades is rendered effective to increase the quantity of the displaced liquid and consequently the velocity and pressure at which the liquid is moved through the duct 28.

The reversing valve 7 may be of any conventional construction but is shown as including a cylindrical housing 52, having a rotating core 53 provided with passageways 54 and 55 adapted to connect the duct 28 with a laterally arranged outlet duct 56 or 57 located on opposite diametrical sides of the valve midway between the connections for the ducts 28 and 29, as shown in Fig. 1, and to connect the duct 29 with the duct 56 or 57 so that the liquid under pressure may be directed from the duct 28 to the duct 56 and returned to the pump unit through the duct 57, passage 55, and duct 29, or the liquid may be discharged under pressure from the duct 28 to the duct 57 and returned by way of the ducts 56 and 29, depending upon the position of the valve core 53.

The motor 6 is shown as including a cylindrical casing 58 having an annular wall 59 closed at one side by a disk-like wall 60, having a hub 61. The opposite side is closed by a removable cover plate 62 having a hub 63 cooperating with the hub 61 to journal the drive shaft 3, previously mentioned. The wall 59 has ports 64 and 65 offset from a plane passing through the axis of the casing to connect with the ducts 56 and 57. Rotatable in the casing is a rotor 66 including spaced disks 67 and 68 interconnected by blades 69. The blades 69 preferably include V-shaped plates 70 arranged in interfitting relation, as shown in Fig. 1, and secured to the disks by welding or the like, the disks being fixed to the shaft 3 so that when the liquid is admitted through the port 64 into impacting relation with the blades, the rotor rotates in a clockwise direction and the liquid discharged through the port 65 for return to the pump, or when the reversing valve is adjusted so that the liquid is admitted under pressure through the port 65 and returned through the port 64, the rotor moves in a counter-clockwise direction, Fig. 1, and at a speed depending upon the amount of liquid circulated by the pump which, of course, is governed by the effective area of the portion of the blades projecting from the cage.

In order to cool the liquid and prevent accumulation of heat, the ducts are preferably provided with radiating fins 71, as shown in Fig. 1.

From the foregoing it is obvious that I have provided a fluid transmission mechanism wherein the speed of the driven member is readily controlled by the amount of liquid displaced by the pump and that the amount of liquid may be readily controlled through adjustment of the cage which varies the effective area of the blades, thereby avoiding heating of the liquid as when the pump capacity is a fixed constant and the speed of the motor is controlled by throttling flow of the liquid.

What I claim and desire to secure by Letters Patent is:

1. In an apparatus of the character described, a housing having a cylindrical chamber and a pressure chamber concentric therewith, a driving shaft concentrically supported in the cylindrical chamber and extending into the pressure chamber, a rotor on the projecting end of the driving shaft, propeller blades on said rotor projecting into the pressure chamber, a cage for said rotor including a disk having radial slots to accommodate said blades and having sliding support relative to the driving shaft, an annular flange connected with the periphery of the disk and having slidable support in the cylindrical chamber, said flange having slots to accommodate outer edges of the blades and means for shifting the cage longitudinally of the shaft to vary the effective portion of the blades within the pressure chamber.

2. In an apparatus of the character described, a housing having a cylindrical chamber and a pressure chamber concentric therewith, a driving shaft concentrically supported in the cylindrical chamber and extending into the pressure chamber, a rotor disk on the projecting end of the shaft, propeller blades on said rotor disk projecting into the pressure chamber, a cage including disks on the respective sides of the rotor disk, and having sliding rotatable support relative to the shaft, an annular flange connecting said last named disk and having sliding support within the cylindrical chamber, said disk on the blade side of the rotor disk having slots to accommodate said blades and registering with slots in the circumferential flange to accommodate the outer edge portions of said blades, and means for shifting the cage relatively to the rotor disk for varying the effective portion of the blades within the pressure chamber.

LIONEL L. GREEN.